United States Patent
Rooyakkers et al.

(10) Patent No.: US 11,736,497 B1
(45) Date of Patent: Aug. 22, 2023

(54) CYBER SECURITY PLATFORM AND METHOD

(71) Applicant: Bedrock Automation Platforms Inc., San Jose, CA (US)

(72) Inventors: Albert Rooyakkers, Sunnyvale, CA (US); Samuel Galpin, Nashua, NH (US); Christopher Harlow, Millis, MA (US)

(73) Assignee: Bedrock Automation Platforms Inc., San Jose, CA (US)

( * ) Notice: Subject to any disclaimer, the term of this patent is extended or adjusted under 35 U.S.C. 154(b) by 548 days.

(21) Appl. No.: 16/358,161

(22) Filed: Mar. 19, 2019

Related U.S. Application Data

(60) Provisional application No. 62/644,827, filed on Mar. 19, 2018.

(51) Int. Cl.
*H04L 29/06* (2006.01)
*H04L 9/40* (2022.01)
*G05B 19/418* (2006.01)

(52) U.S. Cl.
CPC ........ *H04L 63/1416* (2013.01); *G05B 19/4185* (2013.01); *H04L 63/06* (2013.01); *H04L 63/0823* (2013.01); *H04L 63/20* (2013.01); *G05B 2219/23317* (2013.01); *G05B 2219/24159* (2013.01)

(58) Field of Classification Search
CPC ... H04L 63/1416; H04L 63/06; H04L 63/0823; H04L 63/20; G05B 19/4185; G05B 2219/23317; G05B 2219/24159
See application file for complete search history.

(56) References Cited

U.S. PATENT DOCUMENTS

| | | | | |
|---|---|---|---|---|
| 6,363,489 B1* | 3/2002 | Comay et al. | ..... | H04L 63/1491 709/224 |
| 6,405,318 B1* | 6/2002 | Rowland | ............. | G06F 21/552 726/22 |
| 7,203,962 B1* | 4/2007 | Moran | .................. | G06F 21/52 726/25 |
| 8,316,440 B1* | 11/2012 | Hsieh et al. | ....... | H04L 63/1483 713/168 |
| 10,250,619 B1* | 4/2019 | Park et al. | ........... | G06F 21/552 |

(Continued)

OTHER PUBLICATIONS

Kangbin Yim et al., Cyber Threats to Industrial Control Systems, Oct. 16, 2015, ACM, Pages: 79-81. (Year: 2015).*

(Continued)

*Primary Examiner* — Luu T Pham
*Assistant Examiner* — Fahimeh Mohammadi
(74) *Attorney, Agent, or Firm* — Kevin E. West; Advent, LLP

(57) ABSTRACT

A method of providing cyber security to an industrial control system is described. The method includes detecting an anomaly and recording and reporting the detected anomaly to a control system within a network associated with the industrial control system. Detecting the anomaly may include recording all unauthorized attempts to connect to a communication port in the network, capturing identifying information associated with the unauthorized attempts, detecting scanning activity of a hacker in the network, detecting an attempt to manipulate a log file to conceal malicious activity in the network; and recording and reporting the detected anomaly to a controller within the network

18 Claims, 3 Drawing Sheets

(56) References Cited

U.S. PATENT DOCUMENTS

| | | | | |
|---|---|---|---|---|
| 2006/0173992 | A1* | 8/2006 | Weber et al. | H04L 63/145 709/224 |
| 2008/0141332 | A1* | 6/2008 | Treinen | H04L 63/1416 726/1 |
| 2009/0287942 | A1* | 11/2009 | Betouin et al. | G06F 21/57 711/E12.092 |
| 2009/0288164 | A1* | 11/2009 | Adelstein et al. | H04L 63/123 726/22 |
| 2010/0313264 | A1* | 12/2010 | Xie et al. | H04L 63/101 726/22 |
| 2012/0284790 | A1* | 11/2012 | Bhargava | G06Q 10/063 726/22 |
| 2013/0227352 | A1* | 8/2013 | Kumarasamy et al. | G06F 11/1461 714/47.1 |
| 2013/0298201 | A1* | 11/2013 | Aravindakshan et al. | H04L 69/164 726/4 |
| 2015/0188779 | A1* | 7/2015 | McCanne et al. | H04L 63/10 709/223 |
| 2016/0088068 | A1* | 3/2016 | Toy | H04L 63/0272 709/219 |
| 2016/0127395 | A1* | 5/2016 | Underwood et al. | G06F 21/556 726/23 |
| 2017/0251013 | A1* | 8/2017 | Kirti et al. | H04L 63/1441 |
| 2017/0272945 | A1* | 9/2017 | Link, II | H04W 12/041 |
| 2018/0004953 | A1* | 1/2018 | Smith, II et al. | G06F 9/45558 |
| 2018/0096153 | A1* | 4/2018 | DeWitte et al. | G06F 16/9535 |
| 2019/0113571 | A1* | 4/2019 | Ackley et al. | G01R 31/31922 |
| 2020/0059520 | A1* | 2/2020 | Mao | G06F 21/62 |
| 2021/0117538 | A1* | 4/2021 | Ono et al. | G06F 21/568 |

OTHER PUBLICATIONS

Mahdi Azimi et al., A Security Test-Bed for Industrial Control Systems, May 31, 2014, ACM, Pages: 26-31. (Year: 2014).*

Qi Zhang et al., Multimodel-Based Incident Prediction and Risk Assessment in Dynamic Cybersecurity Protection for Industrial Control Systems, Oct. 2016, IEEE, Volume: 46, Issue: 10, Pages: 1429-1444. (Year: 2016).*

Tiago Cruz et al., Improving Network Security Monitoring for Industrial Control Systems, Jul. 2, 2015, IEEE, Pages: 878-881. (Year : 2015).*

* cited by examiner

US 11,736,497 B1

CYBER SECURITY PLATFORM AND METHOD

BACKGROUND

Industrial control systems, such as standard industrial control systems (ICS) or programmable automation controllers (PAC), include various types of control equipment used in industrial production, such as supervisory control and data acquisition (SCADA) systems, distributed control systems (DCS), programmable logic controllers (PLC), and industrial safety systems certified to safety standards such as IEC1508. These systems are used in industries including electrical, water and wastewater, oil and gas production and refining, chemical, food, pharmaceuticals and robotics. Using information collected from various types of sensors to measure process variables, automated and/or operator-driven supervisory commands from the industrial control system can be transmitted to various actuator devices such as control valves, hydraulic actuators, magnetic actuators, electrical switches, motors, solenoids, and the like. These actuator devices collect data from sensors and sensor systems, open and close valves and breakers, regulate valves and motors, monitor the industrial process for alarm conditions, and so forth.

In some cases, industrial control system communications involving legacy devices, such as for example legacy PLCs, may face security issues.

DETAILED DESCRIPTION

Overview

Figure 1:
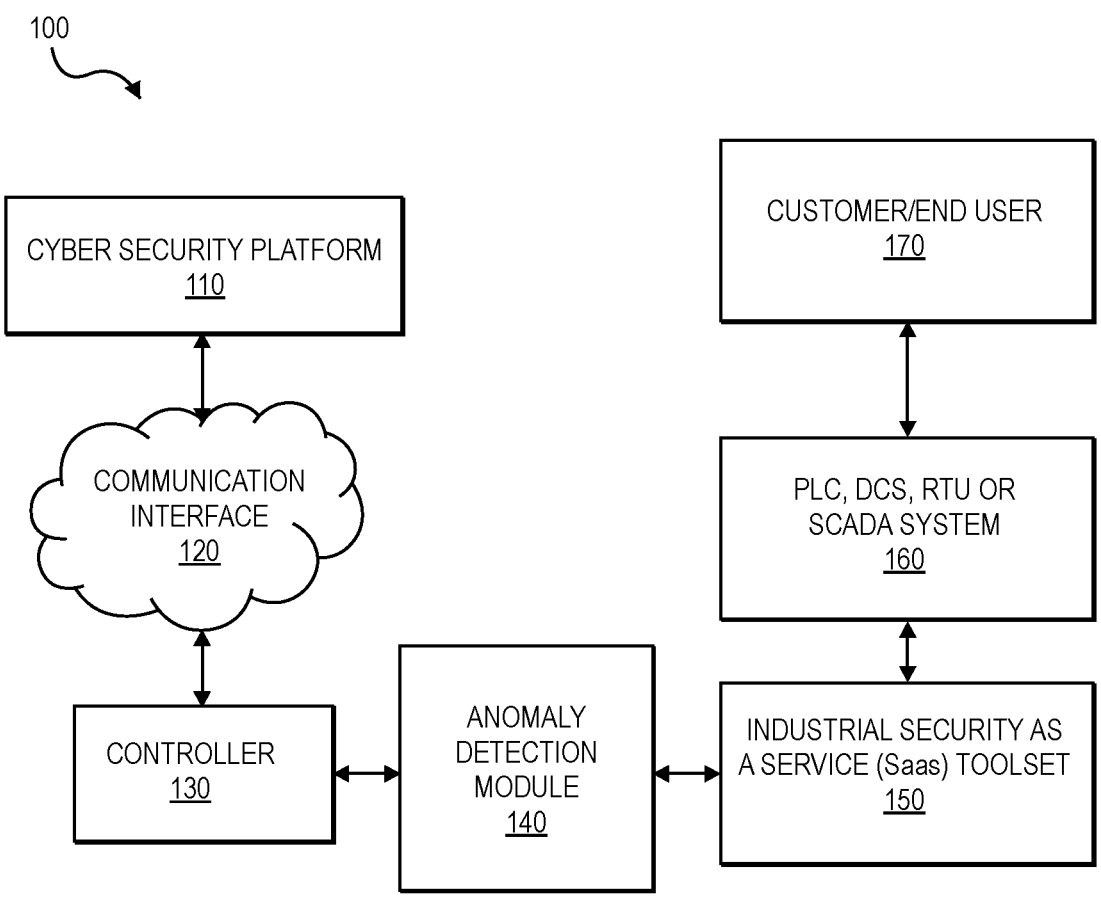
FIG. 1 is block diagram illustrating an example industrial control system including a cyber security platform to one embodiment of the present disclosure.

Referring generally to FIGS. 1 through 5, an example industrial control system (ICS) (e.g., a secure industrial control system) 100 is described in accordance with example implementations of the present disclosure. The term "industrial control system" as used herein may encompass several types of control systems used in industrial production, including process control systems (PCS), supervisory control and data acquisition (SCADA) systems, distributed control systems (DCS), and other smaller control system configurations such as programmable logic controllers (PLC) often found in the industrial sectors and critical infrastructures. The industrial control system 100 may be implemented in a variety of industries, such as electrical, water, oil, gas, data, and so forth. In implementations, based on information received from remote stations, automated or operator-driven supervisory commands can be transmitted to remote station control devices (e.g., field devices) of the industrial control system 100. The field devices of the industrial control system 100 can control local operations such as opening and closing valves and breakers, collecting data from sensor systems, and monitoring the local environment for alarm conditions.

Systems and methods for a cyber security platform for an industrial control system are disclosed in accordance with example embodiments of the disclosure. According to one embodiment of the disclosure, a cyber security platform for an industrial control system includes an anomaly detection module. The cyber security platform may be capable of being executed continuously in a controller. The cyber security platform includes a dynamic port connection monitoring module to record attempts to connect to one or more communication ports. The cyber security platform further includes a network port scanning module to detect scanning activity of a hacker in a network associated with the industrial control system, a system time monitoring module to detect and log attempts to manipulate log files to conceal malicious activity, and further includes an intrusion event logging module. The intrusion event logging module communicates with the dynamic port connection monitoring module, the network port scanning module, and the system time monitoring module and may detect anomalies, based at least on the attempts of an intruder to connect to one or more communication ports, detected scanning activity or detected attempts to manipulate log files. The cyber security platform further includes an industrial software as a service (SaaS) toolset for defining and delivering at least one of a key or a certificate of a Public Key Infrastructure (PKI) in a network associated with the industrial control system.

According to another embodiment of the disclosure, a method of providing cyber security to an industrial control system can be provided. The method includes detecting an anomaly. Detecting an anomaly includes recording all unauthorized attempts to connect to a communication port in a network associated with the industrial control system, capturing identifying information associated with the unauthorized attempts, detecting scanning activity of a hacker in the network, and detecting an attempt to manipulate a log file to conceal malicious activity in the network. The method further includes recording and reporting the detected anomaly to a control system within the network.

According to another embodiment of the disclosure, an anomaly detection module for an industrial control system can include a dynamic port connection monitoring module to record attempts to connect to one or more communication ports, a network port scanning module to detect scanning activity of a hacker in a network associated with the industrial control system, a system time monitoring module to detect and log attempts to manipulate log files to conceal malicious activity, and an intrusion event logging module. The intrusion event logging module can be in communication with the dynamic port connection monitoring module, the network port scanning module, and the system time monitoring module. The intrusion event module may detect anomalies based in part on an intruder's attempts to connect to one or more communication ports, detected scanning activity or detected attempts to manipulate log files.

These and other example embodiments are now described in detail herein with reference to the accompanying drawings. Unless otherwise expressly stated, in the drawings, the sizes, positions, etc., of components, features, elements, etc., as well as any distances therebetween, are not necessarily to scale, but may be exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," "approximately," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

Example Industrial Control System Modules and Processes

One or more technical effects associated with certain embodiments herein may include, but are not limited to, facilitating users of Programmable Logic Controllers (PLC), Distributed Control Systems (DCS), Remote Terminal Unit (RTU) and Supervisory Control and Data Acquisition (SCADA) to implement automation that is both open and secure at the same time. Certain embodiments herein may also provide industrial automation security that is intrinsic, adaptive, and low cost to users. Also, securing digital power systems is critical for holistic cyber security.

SCADA systems can be used with industrial processes, including manufacturing, production, power generation, fabrication, and refining. SCADA system can also be used with infrastructure processes, including water treatment and distribution, wastewater collection and treatment, oil and gas pipelines, electrical power transmission and distribution, wind farms, large communication systems, and so forth. Further, SCADA systems can be used in facility processes for buildings, airports, ships, space stations, and the like (e.g., to monitor and control Heating, Ventilation, and Air Conditioning (HVAC) equipment and energy consumption). DCS systems are generally used in large campus industrial process plants, such as oil and gas, refining, chemical, pharmaceutical, food and beverage, water and wastewater, pulp and paper, utility power, mining, metals, and so forth. PLCs are typically used in industrial sectors and with critical infrastructures.

In an implementation, a cyber security platform includes an Open Platform Communication (OPC) Unified Architecture (UA) standard that supports cyber security capabilities to provide end-users options for integrating authentication keys to protect those communications. The platform includes the most secure OPC UA implementation, which is to have those keys authenticated by a known root of trust and supplied via a platform certificate authority (CA) validated against the cryptographic keys built into its controller.

In an implementation, the platform Certificate Authority (CA) can include an industrial Security as a Service (SaaS) toolset for users to define and deliver the keys and certificates of a Public Key Infrastructure (PKI) in an engineering and/or SCADA network. SCADA Security Platform Specifications may be issued to make it easy for developers to use the CA and secure applications. These specifications lay out simple procedures for developers to convert any OPC UA compliant client into a highly secure OPC UA channel, across which users can authenticate and/or encrypt data between plant floor operations and SCADA applications.

Now referring to FIG. 1, in an implementation, an industrial control system 100 can include a cyber security platform 110. The industrial control system 100 can also include a toolbox, such as the Industrial Security as a Service (SaaS) toolset 150. Alternately, the cyber security platform 110 can include the SaaS toolset 150. The cyber security platform can also include a module for detecting system security, such as Anomaly Detection (AD) module 140 of FIG. 1. AD module 140 can run continuously in a controller 130 associated within the industrial control system 100 upon power up, thus monitoring the controller's 130 network and system time to detect intrusions and anomalous behavior. The Anomaly detector module 140 and the Industrial Security as a Services (SaaS) toolset 150 are shown in FIG. 1 as being separate from the controller 130 and cyber security platform 110 linked by a communication interface 120 that may be one of: an ethernet interface, an USB interface, a wired interface or a wireless interface. In other embodiments, the Anomaly detector module 140 and the Industrial Security as a Services (SaaS) toolset 150 may form an integral part of the cyber security platform 110 or the controller 130.

In an implementation, Anomaly Detection (AD) module 140 can include a dynamic port connection monitoring module (not shown), which can record some or all attempts to connect to any controller or communication point. The AD module can capture identifying information associated with the connection attempt (e.g., intruder information). The dynamic port connection monitoring module may record connection records including, IPv4/IPv6 address of the initiating host, the TCP or UDP port number, subject name in the certificate provided by the initiating host, certificate thumbprint, and/or a status indicating the success or failure to connect. The Anomaly Detection module 140 can further include a network port scanning module, which can detect potential hackers scanning for open ports in the network that may provide access to the industrial control system 100. The networking port scanning module in conjunction with a packet storm detection module can prevent attackers that scan ports to identify open ports that may provide entry points for cyber malicious activity. The network port scanning module can mitigate potential attacks created by packet storms that create a denial of service attach by a malicious entity or due to an innocent network problem. The network port scanning module can record, for example, source IP address, destination port, network protocol (TCP or UDP), and/or incoming packet rate for both types of attacks.

The AD module 140 can also include a system time monitoring module, which can detect attempts to manipulate log files to conceal malicious activity. In an embodiment, the system time monitoring module can log all time changes larger than routine synchronization adjustments. Logged events may include the IP address of the time update source, time change, and current system time. The AD module 140 can further include an intrusion event logging module, which can record all or any detected anomalies and report the detected anomaly to supervisory Control and Data Acquisition (SCADA) software (e.g., the controller running the software) through OPC UA. In an embodiment, the AD module 140 can include, for example, standard database access for historian, alarming, and/or trending functions. In some embodiments, an alert device (e.g., a tri-color status light-emitting diode (LED) or another light source; or an audible warning generator) can be disposed on a faceplate of the controller 130, which can provide a smart indication locally whenever an intrusion is detected. The intrusion event logging module can include a Security Event Alarming Logging (SEAL) that can see only network packets directed to the controller.

The cyber security platform 110 can also include a cryptographic controller engineering key lock, which permits only users with the required credentials to change the mode of the controller 130. This credential can be different from the credentials required to edit process logic. This functionality is analogous to the physical key switch found on some programmable logic controllers (PLCs) and/or safety systems. The cryptographic controller engineering key lock can provide controller 130 high level enforcement for policies such as requiring a supervisor to unlock the controller before an approved user can make changes. Additionally, all accesses and changes to the virtual key lock may be logged.

The cyber security platform 110 and the Industrial Security as a Service (SaaS) toolset can integrate secure open standard communications protocols with legacy PLC and DCS systems 160. In implementations, the cyber security platform 110 can leverage its control system-based secret root keys and certificates to employ advanced cryptographic authentication of hardware components for authenticated communications with secure OPC UA capable SCADA platforms 160. The cyber security platform 110 may include a secure proxy module that may establish communication protocol with legacy PLC and DCS systems. This secure proxy module may be deployed by introducing an OSA controller and secure gateway module into the existing control network. The cyber security platform 110 may employ hardware firewall capabilities when placed between the workstations running the SCADA platform and legacy automation.

All data sent from a PLC may first be sent to a system module in the secure proxy module, which may then collect the data and translate it from legacy (e.g., PLC, DCS) protocols into a secure messaging format. From there, the data may be encrypted using the authentication keys. Data may be transmitted via electromagnetic signals across a pin-less backplane to the system OSA Controller. The system OSA Controller's OPC UA server may transmit the data up to the SCADA platform via a secure OPC UA connection. Communication from the SCADA platform back to the legacy automation may follow steps that reverse the above process.

In an implementation, the cyber security platform 110 and the Industrial Security as a Service (SaaS) toolset 150 can be certified compliant with Achilles® Communication Robustness Level (CRT) Level 2, which tests communications robustness of networks and operational parameters. The cyber security platform 110 can also certify its standalone Industrial Internet of Things (IIoT) power systems to Achilles Level 2.

In an implementation the cyber security platform 110 can include a security protocol module that may include integrated authentication keys (e.g., in the form of a cryptographic controller engineering key lock). Such integrated authentication keys can be capable of protecting communications within the industrial control system 100, such as communications via the communication interface 120. In an implementation, the cryptographic controller engineering key lock can include a virtual key lock. Any or all access and changes to the virtual key lock can be logged at the controller 130.

The cyber security platform 110, including some or all of its components, in an industrial control system can operate under computer control. For example, a processor can be included with or in the industrial control system module to control the components and functions of the industrial control system module described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the industrial control system module. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The cyber security platform 110 can, for example, include a security credential source, a security credential implementer, and the industrial elements of the industrial control system 100. The industrial elements may include one or more processors 305 (e.g., a controller 130), a communication module (e.g., communications connection(s) 310), and an input/output module combination 108. The security credential source of the cyber security platform 110 can be configured to generate unique security credentials (e.g., keys, certificates, etc.). The security credential implementer can be configured to provide the industrial elements with the unique security credential generated by the security credential source. For instance, the communications control module 106, the input/output module 108 may each be provided with unique security credentials (e.g., keys and certificates). An authentication process for authenticating the industrial elements implemented in the industrial control system may be performed based upon the security credentials.

Figure 2:
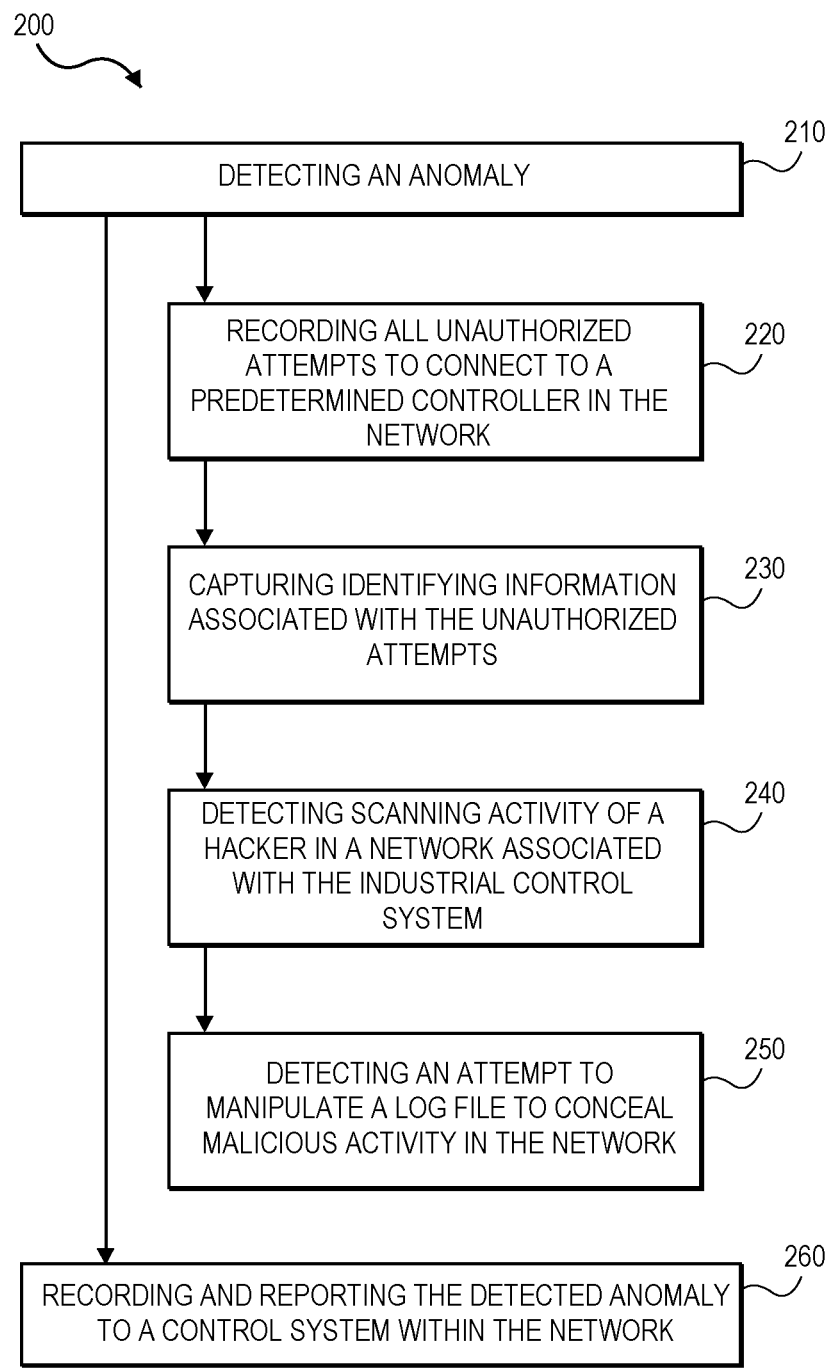
FIG. 2 illustrates an example flowchart of a method for providing cyber security to an industrial control system in accordance with certain embodiments of the disclosure.

Referring now to FIG. 2, a flow diagram of an example method 200 for providing cyber security to an industrial control system 100 is shown, according to an example embodiment of the disclosure. The method 200 may be utilized in association with various systems, such as the system 100 illustrated in FIG. 1, the cyber security platform 110 or the anomaly detection module 140 illustrated in FIG. 1, and/or the control system 130 illustrated in FIG. 3.

The method may begin at block 210. At block 210, an anomaly may be detected. Detecting an anomaly may further involve recording all unauthorized attempts to connect to a predetermined controller in a network associated with the industrial control system, as indicated in block 220. At block 230, the anomaly detection step may further include capturing identifying information associated with the unauthorized attempts. The anomaly detection step 210 may further include detecting scanning activity of a hacker in the network, as illustrated in block 240. At block 250, the anomaly detection step 210 may further include detecting any attempt to manipulate a log file to conceal malicious activity in the network. The method 200 ends at block 260, where the detected anomaly is detected and reported to a controller 130 within the network of the industrial control system 100.

Figure 3:
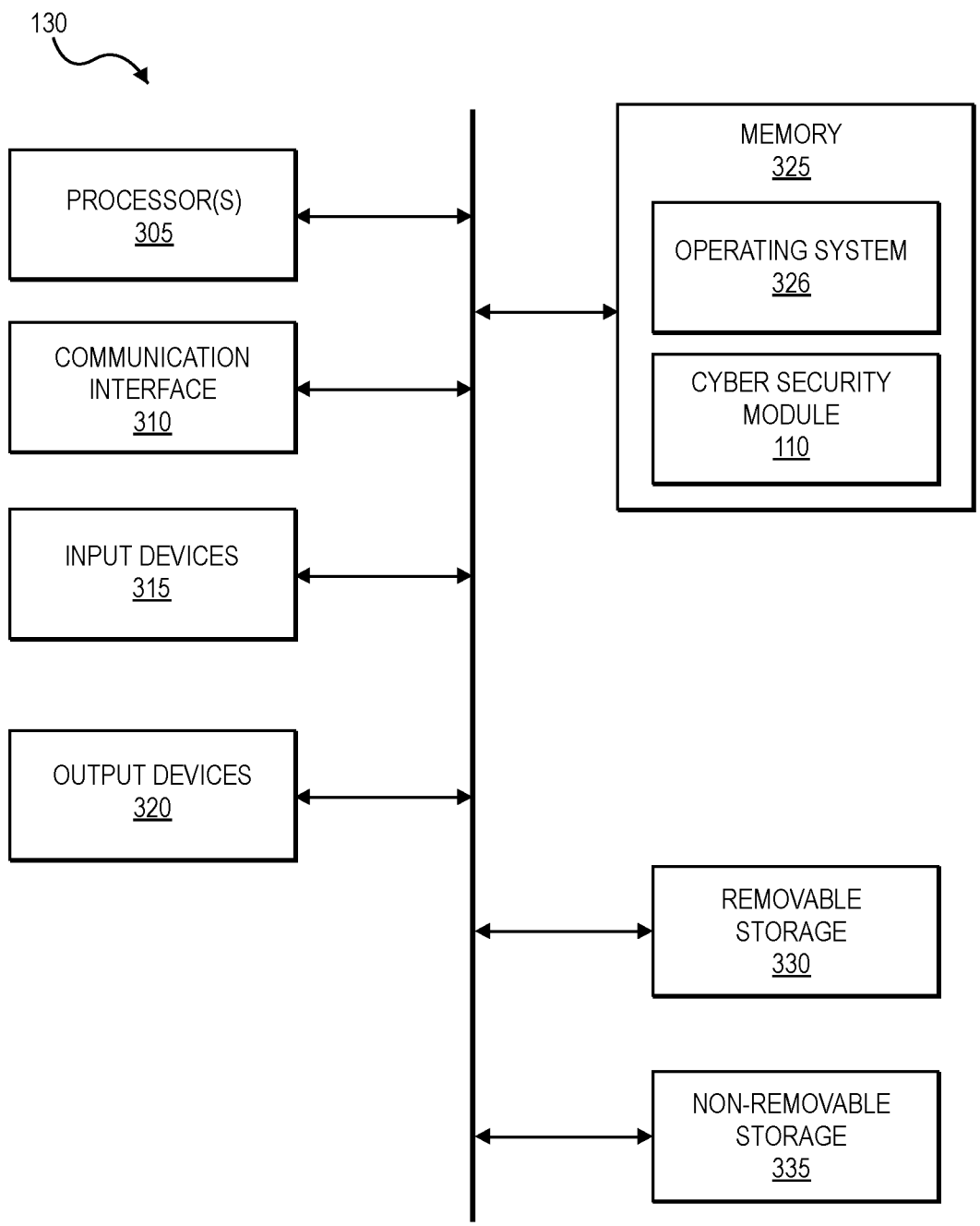
FIG. 3 is an example control system 130 configured to provide integrate systems and methods for a cybersecurity platform in an industrial control system 100 in accordance with an embodiment of the disclosure.

As indicated in FIG. 1, the industrial control system 100 can include a controller 130 for controlling authentication operations, encryption, cryptographic communications, and so forth. Referring now to FIG. 3, the controller 130 can include a processor 205, a memory 325, and a communications interface 310 (e.g., corresponding to communication interface 120 of FIG. 1). The processor 305 can provide a processing functionality for the controller \130 and can include any number of processors, micro-controllers, or other processing systems, and resident or external memory for storing data and other information accessed or generated by the controller. The processor 305 can execute one or more software programs that implement techniques described herein. The processor 305 is not limited by the materials from which it is formed or the processing mechanisms employed therein and, as such, can be implemented via semiconductor(s) and/or transistors (e.g., using electronic integrated circuit (IC) components), and so forth.

The memory 325 is an example of tangible, computer-readable storage medium that provides storage functionality to store various data associated with operation of the controller 130, such as software programs and/or code segments, or other data to instruct the processor, and possibly other components of the controller 130, to perform the functionality described herein. Thus, the memory 325 can store data, such as a program of instructions for operating the industrial control system 100 (including its components), or the cyber security module 110 and so forth. In embodiments of the disclosure, the memory 325 can store an encryption key and/or confidential information for the industrial control system 100. It should be noted that while a single memory is described, a wide variety of types and combinations of memory (e.g., tangible, non-transitory memory) can be employed. The memory 325 can be integral with the processor 205, can comprise stand-alone memory, or can be a combination of both.

The memory 325 can include, but is not necessarily limited to: removable and non-removable memory components, such as an operating system 326, random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the industrial control system module and/or the memory can include removable integrated circuit card (ICC) memory, such as memory provided by a subscriber identity module (SIM) card, a universal subscriber identity module (USIM) card, a universal integrated circuit card (UICC), and so on.

The memory 325, the removable storage 330, and the non-removable storage 335 are all examples of computer-readable storage media. For example, computer-readable storage media can include volatile and non-volatile, removable and non-removable media implemented in any method or technology for storage of information such as computer-readable instructions, data structures, program modules or other data. Additional types of computer storage media that can be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

The communications interface 310 is operatively configured to communicate with components of the industrial control system module. For example, the communications interface can be configured to transmit data for storage in the industrial control system module, retrieve data from storage in the industrial control system module, and so forth. The communications interface 310 can also be communicatively coupled with the processor 305 to facilitate data transfer between components of the industrial control system 100 and the processor 305 (e.g., for communicating inputs to the processor received from a device communicatively coupled with the controller). In some embodiments, the communications interface 310 can be configured to provide one or more communications connections or interconnects. Connections can also be established via various data communication channels or ports, such as USB or COM ports to receive cables connecting the controller 130 to various other devices on a network. In one embodiment, the controller 130 can include Ethernet drivers that enable the controller 130 to communicate with other devices on the network. It should be noted that while the communications interface 120/310 is described as a component of a controller 130, one or more components of the communications interface can be implemented as external components communicatively coupled to the industrial control system module via a wired and/or wireless connection. The industrial control system 100 can also comprise and/or connect (e.g., via the communications interface 120) to one or more input/output (I/O) devices (e.g., I/O module), such as input device 315 and output device 320, including, but not necessarily limited to: a display, a mouse, a touchpad, a keyboard, and so on. The controller 130 may also include removable storage 330 and non-removable storage 335.

The input/output modules 315/320 may be configured to collect data and control systems in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

The communications interface and/or the processor can be configured to communicate with a variety of different networks (e.g., network), including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 140 can be configured to communicate with a single network or multiple networks across different access points.

Communication between one or more of the components (e.g., the communications interface 140/communications interface 310) and/or physical interconnect devices of the industrial control system 100 may include an authentication process. The authentication process may be performed for authenticating a component and/or physical interconnect device implemented in the industrial control system 100. In implementations, the authentication process may utilize security credentials associated with the component and/or physical interconnect device for authenticating that component and/or physical interconnect device. For example, the security credentials may include encryption keys, certificates (e.g., public key certificates, digital certificates, identity certificates, security certificates, asymmetric certificates, standard certificates, non-standard certificates) and/or identification numbers. In embodiments, controllers (e.g., secure microcontrollers) which are included in/connected to the components and/or physical interconnect devices of the industrial control system 100 may be configured for performing the authentication process for promoting secure communication between the components and/or physical interconnect devices.

Varying levels of security (e.g., scalable, user-configured amounts of security) may be provided by the authentication process. For example, a base level of security may be provided which authenticates the industrial elements and protects code within the industrial elements. Other layers of security can be added as well. For example, security may be implemented to such a degree that a component, such as a power module (not shown), may not power up without proper authentication occurring. In implementations, encryption in the code is implemented in the industrial elements, security credentials (e.g., keys and certificates) are implemented on the industrial elements. Security may be distributed (e.g., flows) through the industrial control system 100. For example, security may flow through the system 100 all the way to an end user, who knows what that module is designed to control in that instance. In embodiments, the authentication process provides encryption, identification of devices for secure communication and authentication of system hardware or software components (e.g., via digital signature). In some embodiments, the industrial elements of the industrial secure control system 100 can be provided with unique security credentials and include controllers (e.g., microcontrollers) for implementing the above-referenced authentication process so that security is provided at multiple (e.g., all) communication levels within the secure industrial control system 100.

In implementations, the authentication process may be implemented to provide for/enable interoperability within the secure industrial control system 100 of industrial elements manufactured and/or supplied by different manufacturers/vendors/suppliers (e.g., OEMs). For example, selective (e.g., some) interoperability between industrial elements manufactured and/or supplied by different manufacturers/vendors/suppliers may be enabled. In embodiments, security credentials (e.g., keys) implemented during authentication may form a hierarchy, thereby allowing for different functions to be performed by different industrial elements of the industrial control system 100.

The communication links connecting the components of the industrial control system 100 may further employ data packets, such as runt packets (e.g., packets smaller than 64 bytes), placed (e.g., injected/stuffed) therein for providing an added level of security. The use of runt packets increases the level of difficulty with which outside information (e.g., malicious content such as false messages, malware (viruses), data mining applications, etc.) can be injected onto the communications links. For example, runt packets may be injected onto a communication link within gaps between data packets transmitted between a communications interface 120/communication connection(s) 310 and input/output devices 315/320 to hinder an external entity's ability to inject malicious content onto the communication link.

As desired, embodiments of the disclosure may include a controller 130 with more or fewer components than are illustrated in FIG. 2. Additionally, certain components of the controller 130 of FIG. 2 may be combined in various embodiments of the disclosure. The controller 130 of FIG. 2 is provided by way of example only.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. An industrial control system comprising:
a controller configured to operatively couple to at least a sensor and an actuator device on a network, the controller including one or more computer processors and one or more computer-readable storage media; and
a cyber security platform for detecting network intrusions and/or anomalous behavior on the industrial control system, the cyber security platform comprising program instructions stored on the one or more computer-readable storage media for execution by at least the one or more processors, the program instructions including:

program instructions to keep out unauthorized users from changing a mode of the controller based on a virtual key lock;

responsive to detecting a second controller or a communication point attempting to connect to the network, program instructions to record at least one of: an Internet Protocol version 4 (IPv4)/Internet Protocol version 6 (IPv6) address of an initiating host, a Transmission Control Protocol (TCP) or User Datagram Protocol (UDP) port number, a subject name in a certificate provided by the initiating host, a certificate thumbprint, or a status indicating a success or failure to connect to the network;

responsive to detecting open port scanning activity on the network, program instructions to record information associated with the open port scanning activity including a source Internet Protocol (IP) address, a destination port, a network protocol (TCP or UDP), or incoming packet rates;

responsive to detecting a system time change, program instructions to record an IP address that initiated the system time change and at least one of: a time change or a current system time; and responsive to detecting either the second controller or a communication point attempting to connect to the network, open port scanning activity on the network, or a system time change, program instructions to initiate an alert on an alert device connected to the controller, wherein the alert indicates an intrusion is detected.

2. The industrial control system of claim 1, wherein the program instructions to keep out unauthorized users from changing a mode of the controller based on a virtual key lock includes program instructions to log all access and changes of the virtual key lock.

3. The industrial control system of claim 1, further comprising program instructions to protect communication within the industrial control system based on integrated authentication keys.

4. The industrial control system of claim 3, wherein the integrated authentication keys are authenticated by a known root of trust.

5. The industrial control system of claim 4, where the known root of trust is included in a certificate of authority.

6. The industrial control system of claim 1, further comprising program instructions to establish communication protocol with legacy Programmable Logic Controllers (PLC) and Distributed Control Systems (DCS).

7. The industrial control system of claim 1, further comprising program instructions to establish communication protocol between legacy Programmable Logic Controllers (PLC) and Distributed Control Systems (DCS) and secure Supervisory Control and Data Acquisition (SCADA) platforms.

8. The industrial control system of claim 6, wherein the program instructions to establish communication protocol with legacy Programmable Logic Controllers (PLC) and Distributed Control Systems (DSC) further comprises:

program instructions to introduce an Open Source Automation (OSA) controller and a secure gateway module into an existing control network;

program instructions to collect and translate data from legacy PLC protocols into a secure messaging format;

program instructions to encrypt the data using integrated authentication keys;

program instructions to transmit data via electromagnetic signals across a pin-less backplane to the OSA controller; and program instructions to transmit data to secure Supervisory Control and Data Acquisition (SCADA) platforms.

9. The industrial control system of claim 1, further comprising:

a status Light Emitting Diode (LED) configured to provide smart indication locally when an intrusion is detected, wherein the program instructions to initiate an alert on an alert device include initiating the status LED.

10. An industrial control system comprising:

a sensor;

an actuator device;

a controller operatively coupled to the sensor and the actuator device on a network, the controller including one or more computer processors;

one or more computer-readable storage media;

a cyber security platform for detecting network intrusions and/or anomalous behavior on the industrial control system, the cyber security platform comprising program instructions stored on the one or more computer-readable storage media for execution by at least one of the one or more processors, the program instructions including:

program instructions to keep out unauthorized users from changing a mode of the controller based on a virtual key lock;

responsive to detecting a second controller or a communication point attempting to connect to the network, program instructions to record at least one of: an Internet Protocol version 4 (IPv4)/Internet Protocol version 6 (IPv6) address of an initiating host, a Transmission Control Protocol (TCP) or User Datagram Protocol (UDP) port number, a subject name in a certificate provided by the initiating host, a certificate thumbprint, or a status indicating a success or failure to connect to the network;

responsive to detecting open port scanning activity on the network, program instructions to record information associated with the open port scanning activity including at least one of: a source Internet Protocol (IP) address, a destination port, a network protocol (TCP or UDP), or incoming packet rates;

responsive to detecting a system time change, program instructions to record an IP address that initiated the system time change and at least one of: a time change or a current system time; and responsive to detecting either the second controller or a communication point attempting to connect to the network, open port scanning activity on the network, or a system time change, program instructions to initiate an alert on an alert device connected to the controller, wherein the alert indicates an intrusion is detected.

11. The industrial control system of claim 10, wherein the program instructions to keep out unauthorized users from changing a mode of the controller based on a virtual key lock includes program instructions to log all access and changes of the virtual key lock.

12. The industrial control system of claim 10, further comprising program instructions to protect communication within the industrial control system based on integrated authentication keys.

13. The industrial control system of claim 12, wherein the integrated authentication keys are authenticated by a known root of trust.

14. The industrial control system of claim 13, where the known root of trust is included in a certificate of authority.

15. The industrial control system of claim 10, further comprising: program instructions to establish communication protocol with legacy Programmable Logic Controllers (PLC) and Distributed Control Systems (DCS).

16. The industrial control system of claim 15, wherein the program instructions to establish communication protocol with legacy Programmable Logic Controllers (PLC) and Distributed Control Systems (DSC) further comprises:

program instructions to introduce an Open Source Automation (OSA) controller and a secure gateway module into an existing control network;

program instructions to collect and translate data from legacy PLC protocols into a secure messaging format;

program instructions to encrypt the data using integrated authentication keys;

program instructions to transmit data via electromagnetic signals across a pin-less backplane to the OSA controller; and program instructions to transmit data to secure Supervisory Control and Data Acquisition (SCADA) platforms.

17. The industrial control system of claim 10, further comprising a status Light Emitting Diode (LED) configured to provide smart indication locally when an intrusion is detected, wherein the program instructions to initiate an alert on an alert device include initiating the status LED.

18. A cyber security program product for detecting network intrusions and/or anomalous behavior on an industrial control system, the industrial control system having a controller operatively coupled to at least a sensor and an actuator device on a network, the cyber security program product comprising:

one or more computer-readable and non-transitory storage media and program instructions stored on the one or more computer-readable and non-transitory storage media, the program instructions configured to be performed by the controller of the industrial control system, the program instructions including:

program instructions to keep out unauthorized users from changing a mode of the controller based on a virtual key lock;

responsive to detecting a second controller or a communication point attempting to connect to the network, program instructions to record at least one of: an Internet Protocol version 4 (IPv4)/Internet Protocol version 6 (IPv6) address of an initiating host, a Transmission Control Protocol (TCP) or User Datagram Protocol (UDP) port number, a subject name in a certificate provided by the initiating host, a certificate thumbprint, or a status indicating a success or failure to connect to the network;

responsive to detecting open port scanning activity on the network, program instructions to record information associated with the open port scanning activity including at least one of: a source Internet Protocol (IP) address, a destination port, a network protocol (TCP or UDP), or incoming packet rates;

responsive to detecting a system time change, program instructions to record an IP address that initiated the system time change and at least one of: a time change or a current system time; and responsive to detecting either the second controller or a communication point attempting to connect to the network, open port scanning activity on the network, or a system time change, program instructions to initiate an alert on an alert device connected to the controller, wherein the alert indicates an intrusion is detected.

\* \* \* \* \*